(12) United States Patent
Iritsuki et al.

(10) Patent No.: US 8,202,665 B2
(45) Date of Patent: Jun. 19, 2012

(54) FUEL CELL APPARATUS

(75) Inventors: Keita Iritsuki, Yokosuka (JP); Yasuhiro Numao, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 469 days.

(21) Appl. No.: 11/189,845

(22) Filed: Jul. 27, 2005

(65) Prior Publication Data

US 2006/0024557 A1 Feb. 2, 2006

(30) Foreign Application Priority Data

Jul. 27, 2004 (JP) ................. 2004-219107

(51) Int. Cl.
*H01M 2/08* (2006.01)
*H01M 8/10* (2006.01)
*H01M 8/24* (2006.01)

(52) U.S. Cl. ............... 429/508; 429/479; 429/483

(58) Field of Classification Search .......... 429/479–483, 429/508
See application file for complete search history.

(56) References Cited

U.S. PATENT DOCUMENTS

| | | | | |
|---|---|---|---|---|
| 4,774,154 A | * | 9/1988 | Singelyn et al. | 429/36 |
| 6,596,427 B1 | * | 7/2003 | Wozniczka et al. | 429/435 |
| 7,014,939 B2 | * | 3/2006 | Suenaga et al. | 429/465 |
| 2003/0087143 A1 | * | 5/2003 | Nakanishi et al. | 429/35 |
| 2003/0096153 A1 | * | 5/2003 | Osenar et al. | 429/35 |
| 2003/0235744 A1 | * | 12/2003 | Pflaesterer | 429/35 |
| 2004/0131905 A1 | * | 7/2004 | Enjoji et al. | 429/26 |
| 2004/0234831 A1 | * | 11/2004 | Kobayashi et al. | 429/30 |
| 2005/0118486 A1 | * | 6/2005 | Strobel et al. | 429/38 |
| 2006/0110646 A1 | | 5/2006 | Suenaga et al. | |

FOREIGN PATENT DOCUMENTS

| | | | |
|---|---|---|---|
| JP | 2001-110439 A | | 4/2001 |
| JP | 2002-305006 A | | 10/2002 |
| JP | 2003-203670 A | | 7/2003 |
| JP | 2003203670 A | * | 7/2003 |
| JP | 2003-297377 A | | 10/2003 |
| JP | 2005-71869 A | | 3/2005 |
| WO | WO 99/41796 | * | 8/1999 |
| WO | WO 03/063264 A2 | * | 7/2003 |

* cited by examiner

*Primary Examiner* — Karie O'Neill Apicella
(74) *Attorney, Agent, or Firm* — Foley & Lardner LLP

(57) ABSTRACT

An aspect of the present invention provides a fuel cell apparatus that includes at least one fuel cell stack including a plurality of unit fuel cells, each unit fuel cell including a membrane electrode assembly including an electrolyte membrane and electrodes arranged on each side the electrode membrane, and a pair of separators sandwiching the membrane electrode assembly, a casing arranged and configured to accommodate the fuel cell stack, and at least one elastic member arranged part or whole of the circumference of the fuel cell stack in contact with an inner wall of the casing.

15 Claims, 8 Drawing Sheets

FUEL CELL APPARATUS

BACKGROUND OF THE INVENTION

The present invention relates to a fuel cell apparatus having a casing for accommodating fuel cells each includes an electrolyte membrane, electrodes arranged on both surfaces of the electrolyte membrane, respectively, and a pair of separators sandwiching the electrolyte membrane and electrodes.

An anti-shock (or vibration proof) structure for a fuel cell is disclosed in Japanese Laid-Open Patent Publication No. 2003-203670. According to the disclosure, a plurality of unit fuel cells are stacked one upon another to form a fuel cell stack. Each side face of the stack in a cell stacking direction is covered with a plate. Between the plate and the stack, there is arranged an elastic member having low-friction, insulation, and shock absorption characteristics.

SUMMARY OF THE INVENTION

Fuel cells are often housed in a casing when used. In the casing, the fuel cells are set to be not in contact with inner walls of the casing. Once the fuel cells in the casing are installed in a mobile body such as a vehicle, the fuel cells and casing are subjected to vibration and shock during the driving of the vehicle. The casing and fuel cells may vibrate under a specific mode such as a torsional mode, bending mode, or rigid vibration mode that applies strong stress to the casing, fuel cells, and parts that support the fuel cells in the casing. Such stress may break the separators and supporting parts of the fuel cells, to deteriorate the performance and reliability of the fuel cells. An object of the present invention is to improve the antishock and vibration proof characteristics of fuel cells enclosed in a casing.

An aspect of the present invention provides a fuel cell apparatus that includes at least one fuel cell stack including a plurality of unit fuel cells, each unit fuel cell including a membrane electrode assembly including an electrolyte membrane and electrodes arranged on each side the electrode membrane, and a pair of separators sandwiching the membrane electrode assembly, a casing arranged and configured to accommodate the fuel cell stack, and at least one elastic member arranged part or whole of the circumference of the fuel cell stack in contact with an inner wall of the casing.

DETAILED DESCRIPTION OF EMBODIMENTS

Figure 1:
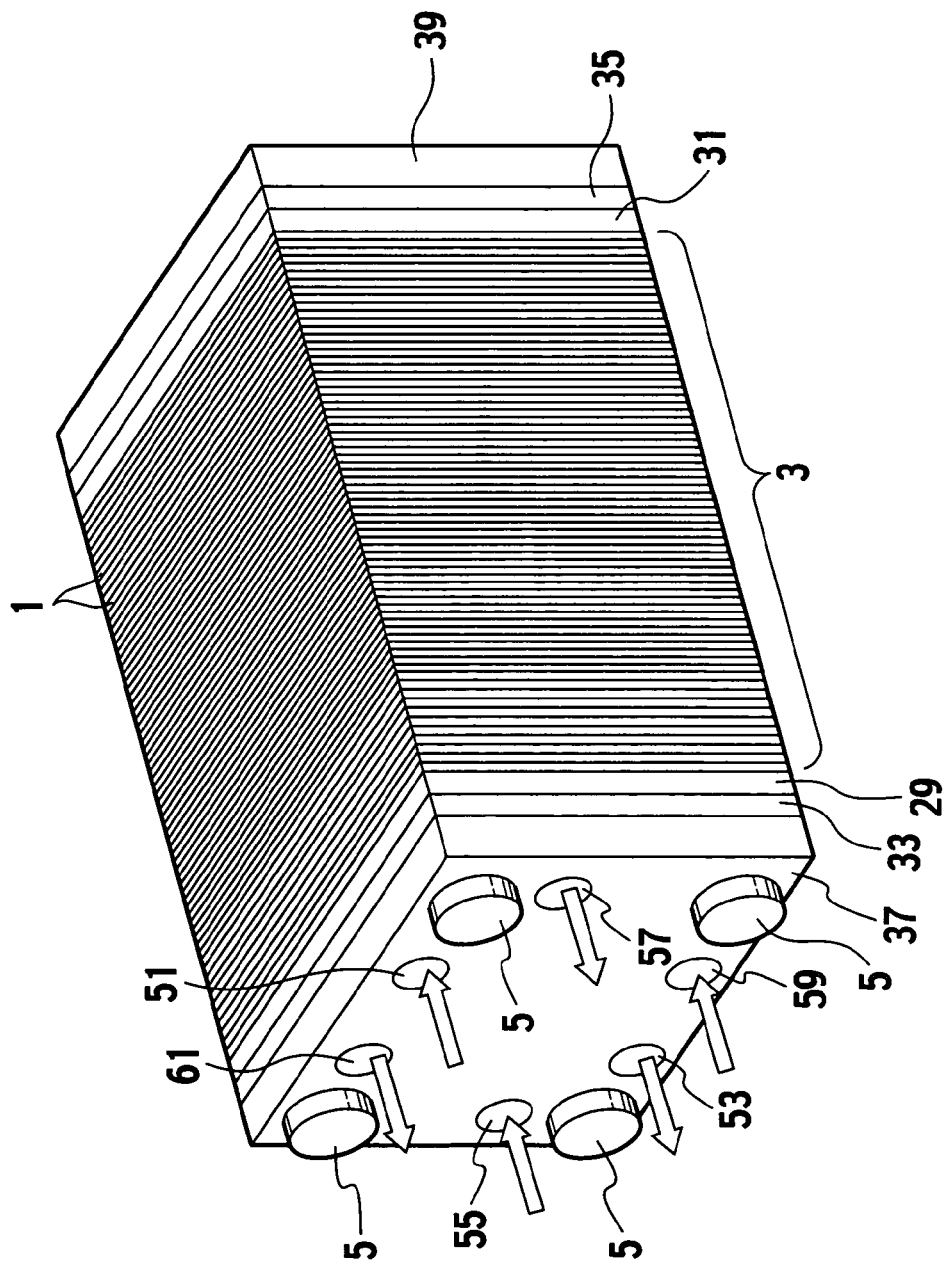
FIG. 1 is a perspective view generally showing a fuel cell stack according to a first embodiment of the present invention.

Various embodiments of the present invention will be described with reference to the accompanying drawings. It is to be noted that same or similar reference numerals are applied to the same or similar parts and elements throughout the drawings, and the description of the same or similar parts and elements will be omitted or simplified.

(First Embodiment)

FIG. 1 is a perspective view generally showing a fuel cell stack according to a first embodiment of the present invention. Fuel cells in this embodiment are employed, but not limited the present invention, solid polymer electrolyte fuel cells and are simply referred to as "fuel cells." The fuel cells are installed in, for example, a fuel-cell vehicle. The fuel cells may be installed in any other purpose. In FIG. 1, a plurality of unit fuel cells 1 each generating a voltage of about 1 V are stacked one upon another to form a fuel cell stack 3. Each fuel cell 1 in the stack 3 is rectangular and thin. A tension rod 5 is passed through each of the four corners of the stack 3, to fasten the fuel cells 1 together. The tension rods 5 apply contact pressure to the stack 3 and maintain the pressure. The tension rods 5 may be made of metal. The number of the tension rods 5 is not limited to four. An optional number of tension rods are usable if they can secure a required fastening force.

Ends of the fuel cell stack 3 in the stacking direction are provided with collecting plates 29 and 31, insulating plates 33 and 35, and end plates 37 and 39. The end plate 37 at one end of the stack 3 has a fuel gas inlet 51, a fuel gas outlet 53, an oxidant gas inlet 55, an oxidant gas outlet 57, a cooling water inlet 59, and a cooling water outlet 61. According to the first embodiment, these inlets and outlets are circular. This, however, does not limit the present invention. They may have arbitrary shapes.

Figure 2:
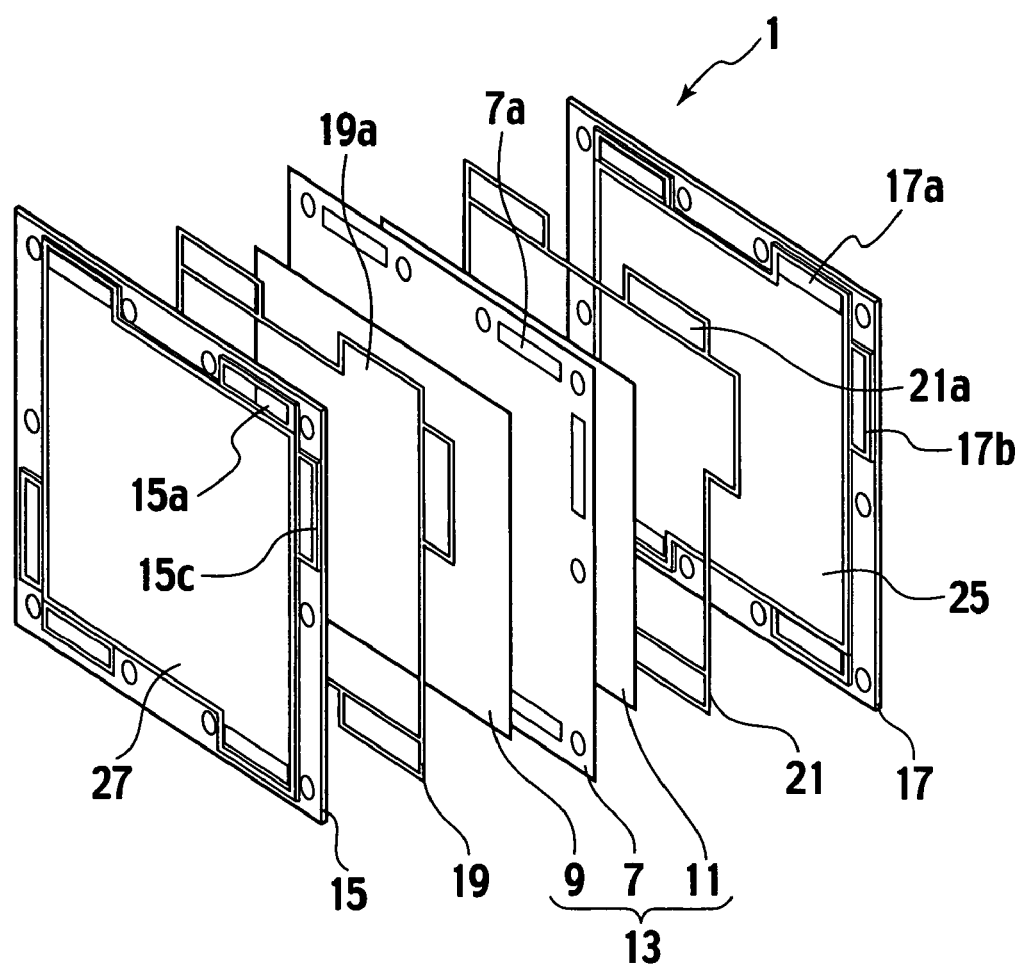
FIG. 2 is an exploded perspective view showing the unit fuel cell 1.

FIG. 2 is an exploded perspective view showing the unit fuel cell 1. The fuel cell 1 has a membrane electrode assembly (MEA) 13 consisting of an electrolyte membrane 7, an anode electrode 9, and a cathode electrode 11. On each side of the MEA 13, there are seals 19 and 21. On the seals 19 and 21, there are separators 15 and 17, respectively. The separator 15 has a passage for supplying a fuel (hydrogen) gas to the anode electrode 9. The separator 17 has a passage 25 for supplying an oxidant (oxygen, usually air) gas to the cathode electrode 11. In the MEA 13, the electrolyte membrane 7 is a polymeric ion exchange membrane, the anode electrode (fuel electrode) 9 has a catalyst layer and a gas diffusion layer, and the cathode electrode (air electrode) 11 has a catalyst layer and a gas diffusion layer. The electrolyte membrane 7 is an ion exchange membrane made of solid polymer such as fluorine-based resin having proton conductivity and showing good electric conductivity under a wet state. The separators 15 and 17 are made by compressing and forming gas-impermeable carbon or a mixture of carbon and thermosetting resin.

The separator 15 has the fuel gas passage (not shown) on the anode electrode 9 side, and the separator 17 has the oxidant gas passage 25 on the cathode electrode 11 side. A coolant passage 27 is formed as required. The fuel gas passage, oxidant gas passage 25, and coolant passage 27 are sealed with the seals 19 and 21 under the fastening force of the tension rods 5 applied to the fuel cells 1 in the stacking direction. The seals 19 and 21 are made of rubber-like elastic material such as silicon rubber, ethylene-propylene-diene rubber (EPDM), and fluorine rubber.

Figure 3:
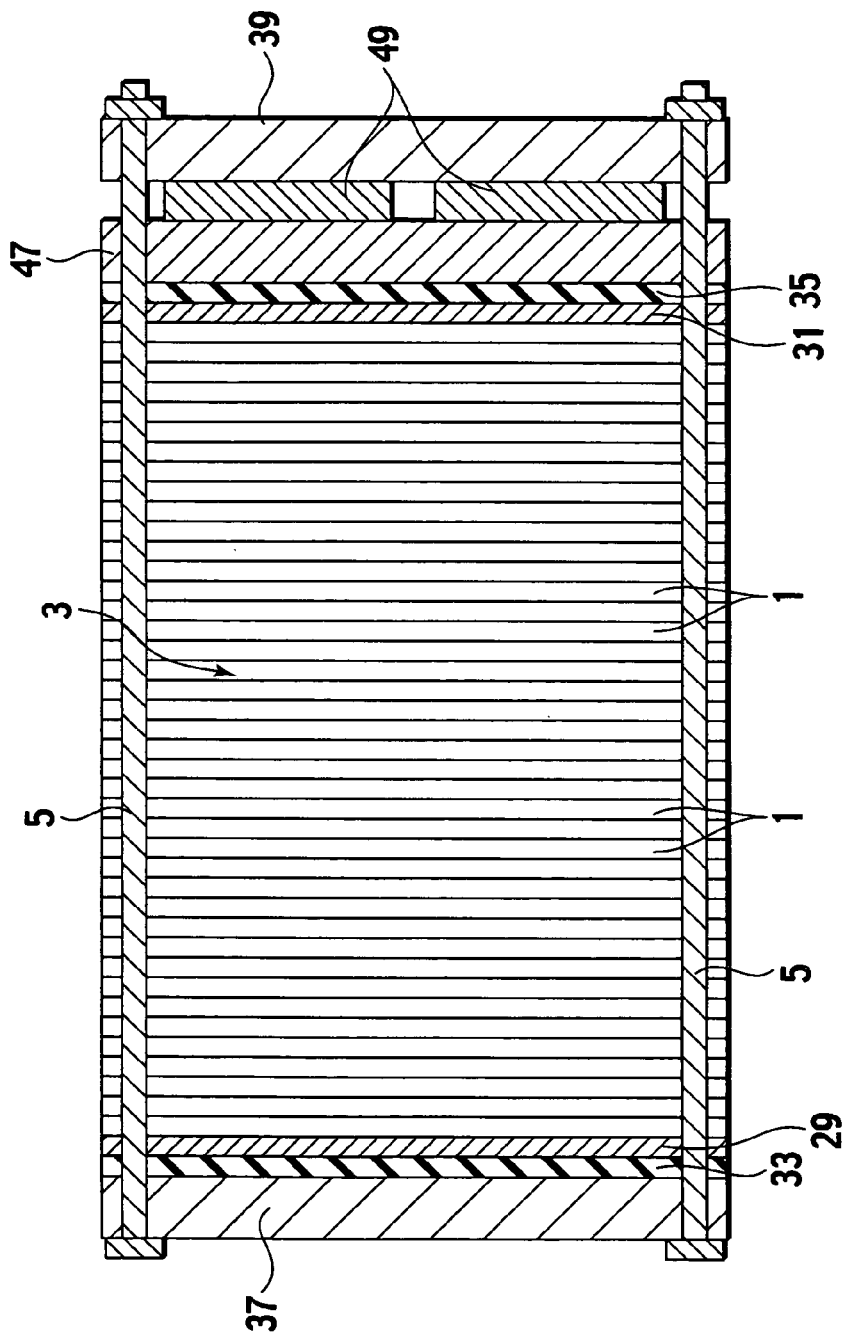
FIG. 3 is a sectional front view showing the fuel cell stack 3 of FIG. 1.

FIG. 3 is a sectional front view showing the fuel cell stack 3 of FIG. 1. At one end of the stack 3, an inner end plate 47 is arranged between the end plate 39 and the insulating plate 35. Between the end plate 39 and the inner end plate 47, there is arranged an absorbing member 49 such as a disc spring to absorb pressure variation acting on the stack 3.

Figure 4:
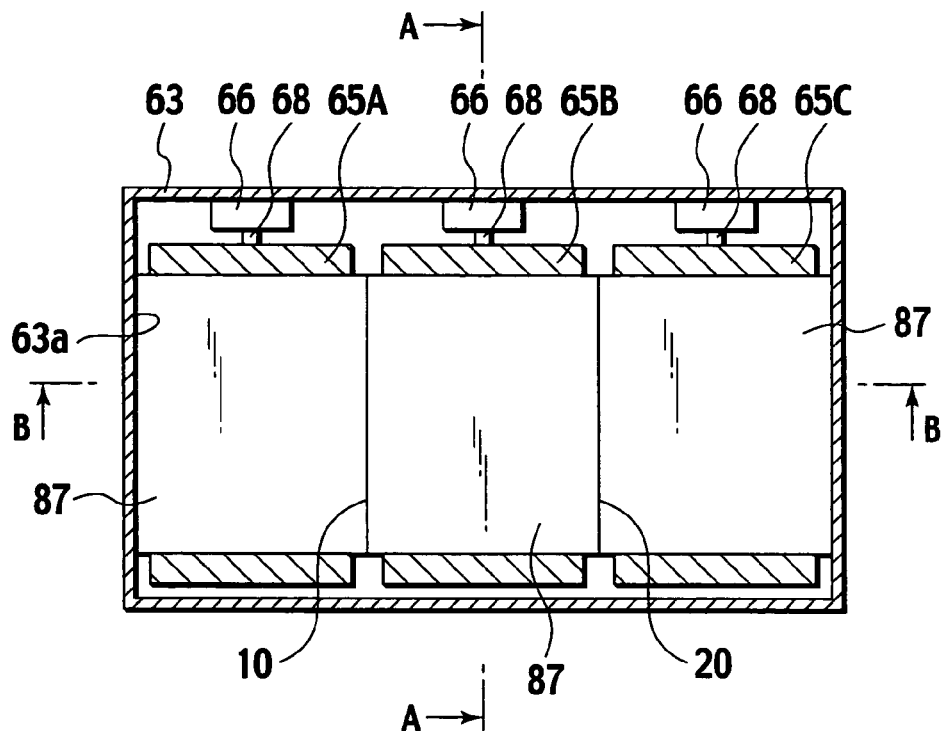
FIG. 4 is a view showing a casing 63 accommodating fuel cell stacks each corresponding to the fuel cell stack 3 of the first embodiment.

FIG. 4 is a view showing a casing 63 accommodating fuel cell stacks each corresponding to the fuel cell stack 3 of the first embodiment. The casing 63 is installed in a mobile body such as a vehicle. The casing 63 encloses a plurality of fuel cell stacks 65A, 65B, and 65C. The casing 63 may be composed of an upper cover and a lower cover that are joined together to define a closed inner space. The number of fuel cell stacks stored in the casing 63 is not limited to three. It may be one, two, four, or more. Each of the stacks 65A, 65B, and 65C is fixed to a block 66 with a rod 68. The block 66 is fixed to a side wall of the casing 63.

Figure 5:
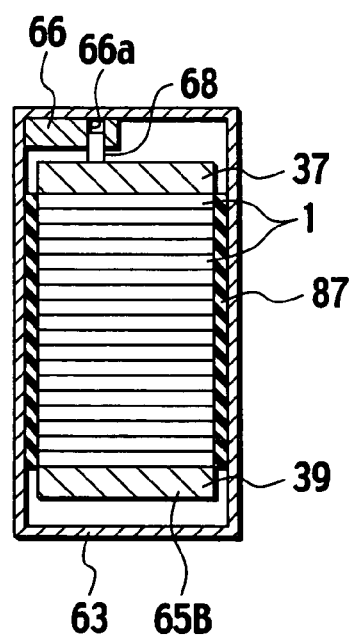
FIG. 5 is a sectional view taken along a line A-A of FIG. 4.

FIG. 5 is a sectional view taken along a line A-A of FIG. 4. One end in the cell stacking direction of each of the fuel cell stacks 65A, 65B, and 65C is fixed to the block 66 with the rod 68. The block 66 is fixed to an inner wall of the casing 63. One end of the rod 68 is fixed to one of the end plates 37 and 39, for example, the end plate 37 of the fuel cell stack, and the other end of the rod 68 is slidably inserted into a slide hole 66a formed in the block 66.

Figure 6:
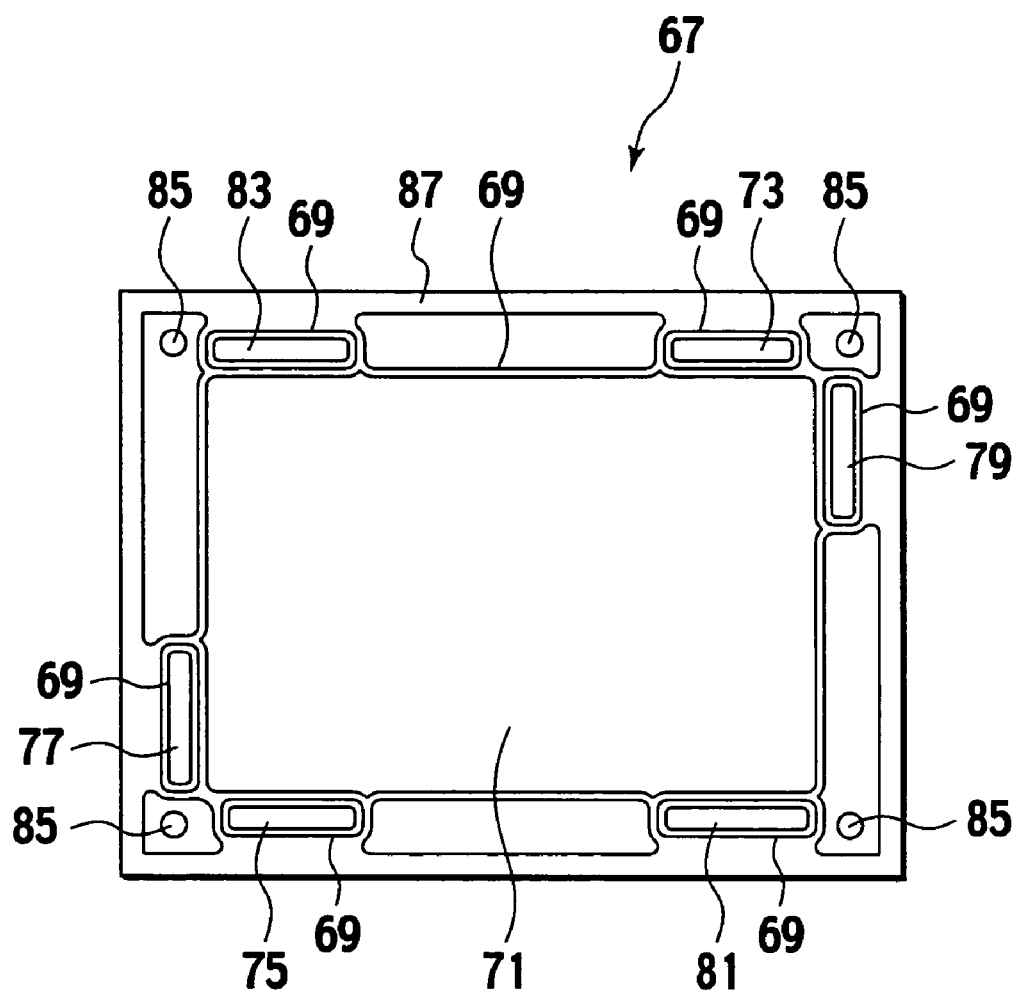
FIG. 6 is a plan view showing a separator used for the fuel cell stack shown in FIG. 4.

FIG. 6 is a plan view showing a separator used for the fuel cell stack shown in FIG. 4. Instead of the separators 15 and 17 shown in FIG. 2, the fuel cell stacks 65A, 65B, and 65C in the casing 63 may employ separators 67 one of which is shown in FIG. 6. The separator 67 has a seal 69 that corresponds to the seal 19 or 21 shown in FIG. 2. The seal 69 is made by, for example, integral molding on the separator 67.

The seal 69 surrounds a reactive gas (fuel gas or oxidant gas) passage 71 and manifold holes 73, 75, 77, 79, 81, and 83. These manifold holes 73, 75, 77, 79, 81, and 83 correspond to the fuel gas inlet 51, fuel gas outlet 53, oxidant gas inlet 55, oxidant gas outlet 57, cooling water inlet 59, and cooling water outlet 61 of FIG. 1, respectively. At the four corners of the separator 67, there are holes 85 to pass the tension rods 5 of FIG. 1. The seal 69 is integral with an elastic member 87 that extends along the periphery of the separator 67. The seal 69 and elastic member 87 are made of the same material. The elastic member 87 may be integral with a seal that is on the back of the separator 67 of FIG. 6 and is between the adjacent unit fuel cells.

Each unit fuel cell 1 may have the separator 67 of FIG. 6, and a plurality of such unit fuel cells 1 are stacked one upon another to form the fuel cell stack 3 shown in FIG. 1. In FIG. 4, the elastic members 87 cover the circumference of the fuel cell stack 3. In this case, the elastic members 87 of the separators 67 may be tightly arranged without a gap in the cell stacking direction. Alternatively, the elastic members 87 of the adjacent unit fuel cells 1 may have a gap between them.

The elastic members 87 of each of the end stacks 65A and 65C in the casing 63 are in contact with an inner wall 63a of the casing 63 at three sides thereof except the side that faces the center stack 65B. The elastic members 87 of the center stack 65B are in contact with the inner wall 63a of the casing 63 at two sides thereof except the two sides that face the end stacks 65A and 65C, respectively. The elastic members 87 of the adjacent stacks 65A and 65B are in contact with each other through a contact area 10. The elastic members 87 of the adjacent stacks 65B and 65C are in contact with each other through a contact area 20. Namely, each of the four side end faces of each elastic member 87 is in contact with the inner wall 63a of the casing 63 or a side end face of the adjacent elastic member 87. This configuration immovably positions the stacks 65A, 65B, and 65C in the casing 63.

If vibration or shock is applied to the casing 63 accommodating the fuel cell stacks 65A, 65B, and 65C during the running of the vehicle in which the casing 63 is installed, the elastic members 87 around the separators 67 absorb the vibration or shock, to prevent the torsional and bending deformation of the casing 63 and stacks 65A, 65B, and 65C. This prevents the breakage of the parts of the casing 63 and stacks 65A, 65B, and 65C and secures the performance and reliability of the fuel cells. This configuration also reduces load on the fuel cell supporting parts such as the blocks 66 and rods 68 and prevents the playing of the fuel cell supporting parts. Also reduced is the vibration of the outer faces of the casing 63. This results in improving the rigidity of the casing 63. Each elastic member 87 may be made of insulating material, and the elastic members 87 in the fuel cell stack 3 may be tightly attached to each other in the cell stacking direction. This eliminates an insulating sheet covering the circumferential face of the stack 65A (65B, 65C), to reduce the total number of parts and weight of the fuel cell apparatus.

According to this embodiment, the elastic member 87 and seal 69 are made of the same material and are integrally formed on the separator 67. Namely, there is no need of adding a new process for forming the elastic member 87, i.e., the configuration of the first embodiment is manufacturable through existing processes. Forming a conventional seal for the separator 67 needs an opening for pouring seal material to be prepared in the plane of the separator 67 in the vicinity of the location where the seal 69 is formed. According to the first embodiment of the present invention, the seal 69 is simultaneously formed with the peripheral elastic member 87, and therefore, an opening for pouring material of the separator 67 and elastic member 87 can be formed at the periphery of the separator 67. Accordingly, the embodiment can effectively use the area of the separator 67 and expand an electricity generating active area.

Figure 7:
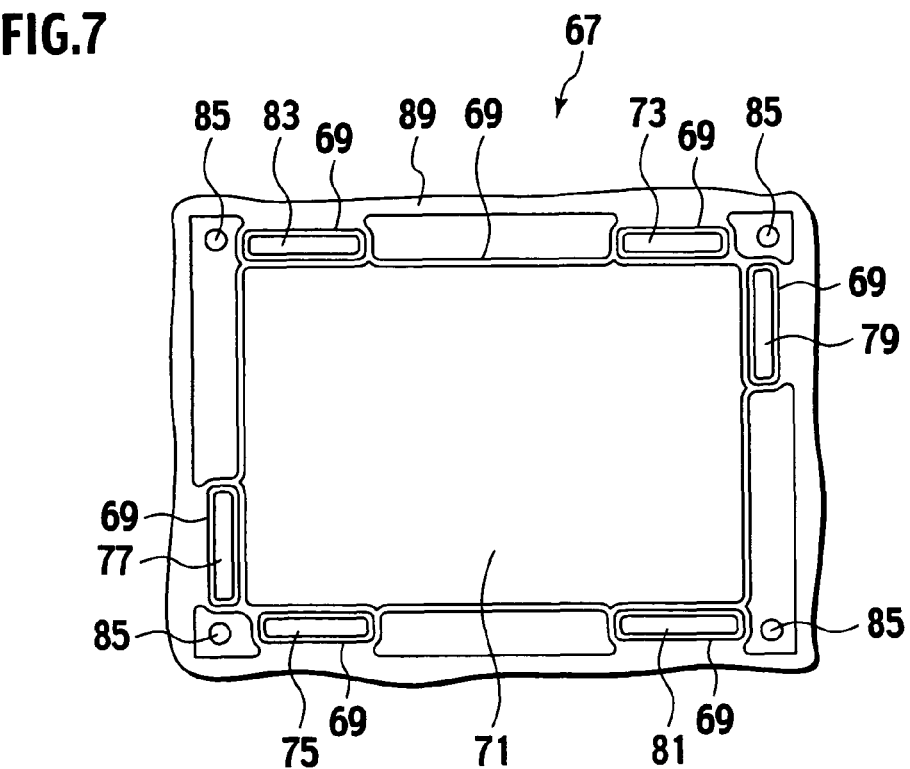
FIG. 7 is a plan view showing a modification of the separator 67 of the first embodiment shown in FIG. 6.

FIG. 7 is a plan view showing a modification of the separator 67 of the first embodiment shown in FIG. 6. According to the modification, the elastic member 89 integral with the seal 69 has an undulated circumferential face. Due to the undulation, the circumferential face of the elastic member 89 partly gets in contact with the inner wall of the casing 63 and the elastic member 89 of the adjacent fuel cell stack. The circumferential face of the elastic member 89 may have any other shape. For example, it may have angular irregularities.

(Second Embodiment)

Figure 8:
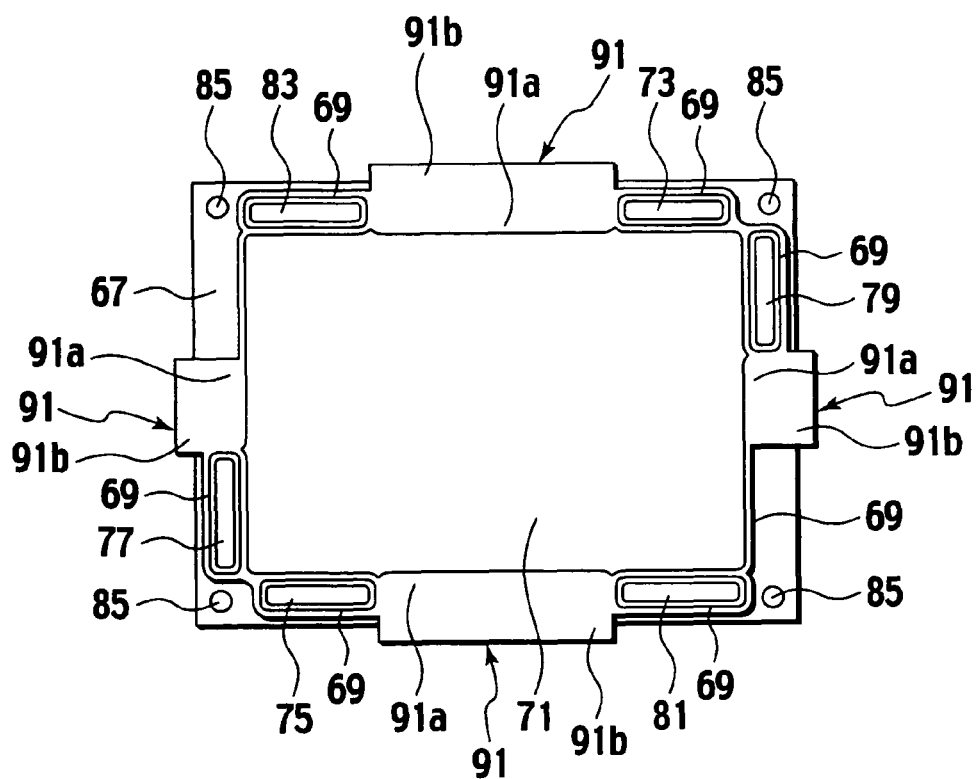
FIG. 8 is a plan view showing a separator 67 for a fuel cell according to a second embodiment of the present invention.

FIG. 8 is a plan view showing a separator 67 for a fuel cell according to a second embodiment of the present invention. The separator 67 has a rectangular shape. From a central part of each edge of the rectangular separator 67, a rectangular elastic member 91 protrudes. The elastic member 91 is integral with a seal 69. The elastic member 91 has an inner part 91a that is on a plane of the separator 67 and an outer part 91b that partly covers a peripheral edge of the separator 67. The parts 91a and 91b provide the elastic member 91 with an L-shaped cross section.

The second embodiment provides the same effect as the first embodiment. The quantity of material necessary for forming the elastic members 91 of the second embodiment is smaller than that for forming the elastic members 89 of the first embodiment As a result, the second embodiment can reduce material cost and weight compared with the first embodiment. When installing the fuel cell stacks 65A, 65B, and 65C in the casing 63, the second embodiment can reduce friction against the inner wall 63a of the casing 63 shown in FIG. 4, to thereby improve installation workability.

(Third Embodiment)

Figure 9:
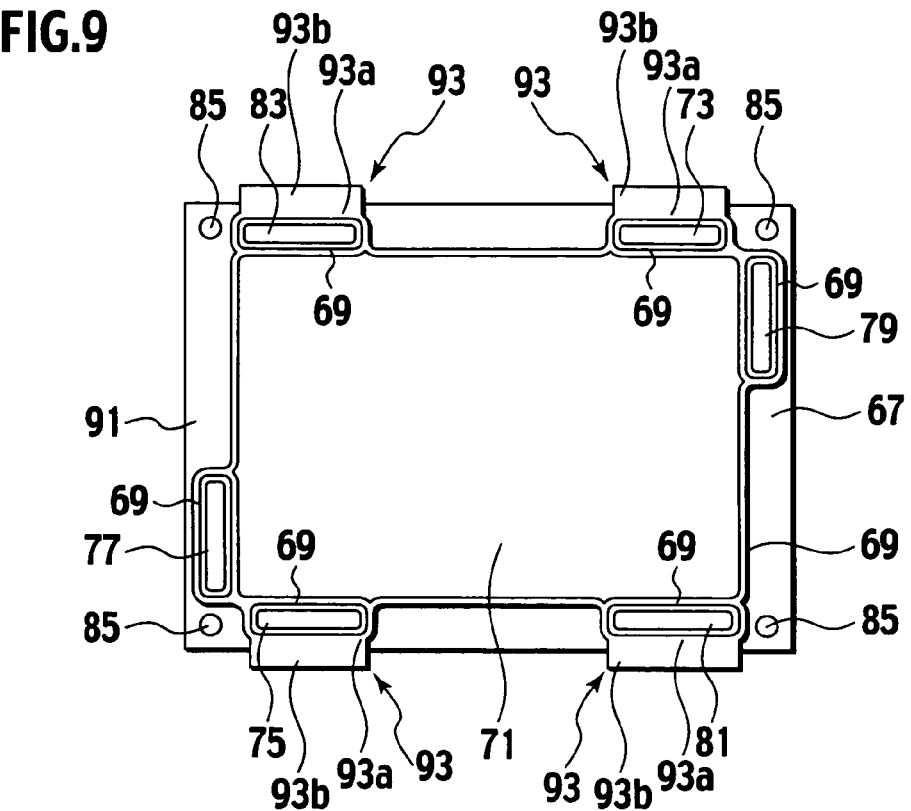
FIG. 9 is a plan view showing a separator 67 for a fuel cell according to a third embodiment of the present invention.

FIG. 9 is a plan view showing a separator 67 for a fuel cell according to a third embodiment of the present invention. The third embodiment arranges two elastic members 93 on each of the top and bottom sides of the separator 67. The elastic members 93 are integral with a seal 69. Like the elastic member 91 of FIG. 8, the elastic member 93 of FIG. 9 has an inner part 93a that is on a plane of the separator 67 and an outer part 93b that partly covers a peripheral edge of the separator 67. The parts 93a and 93b provide the elastic member 93 with an L-shaped cross section.

(Fourth Embodiment)

Figure 10:
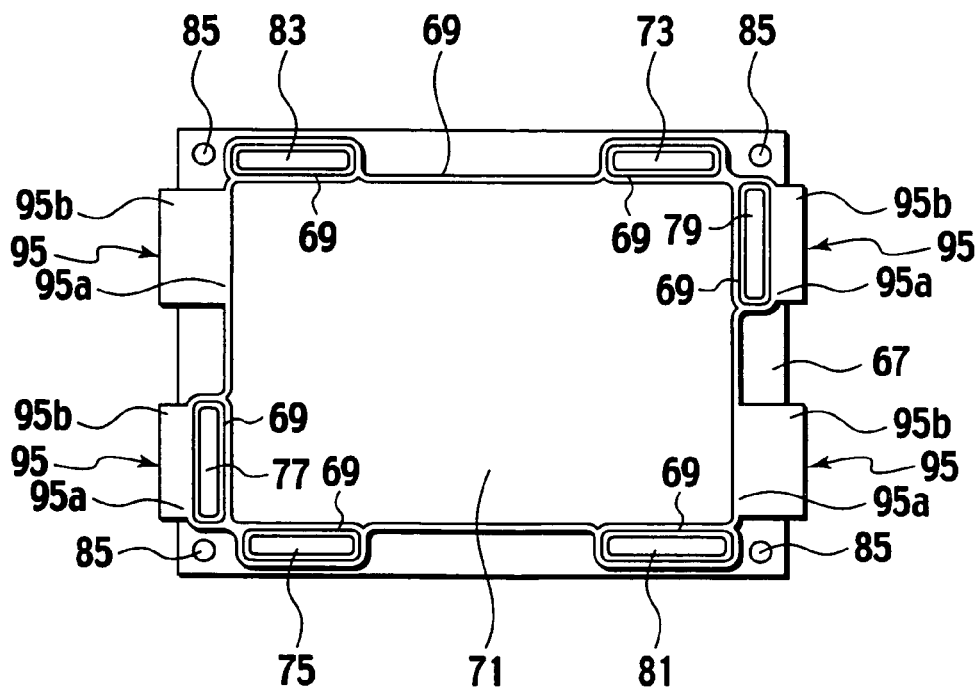
FIG. 10 is a plan view showing a separator 67 for a fuel cell according to a fourth embodiment of the present invention.

FIG. 10 is a plan view showing a separator 67 for a fuel cell according to a fourth embodiment of the present invention. The fourth embodiment arranges two elastic members 95 on each of the left and right sides of the separator 67. Like the elastic member 91 of FIG. 8, the elastic member 95 of FIG. 10 has an inner part 95a that is on a plane of the separator 67 and an outer part 95b that partly covers a peripheral edge of the separator 67. The parts 95a and 95b provide the elastic member 95 with an L-shaped cross section.

The elastic members 91, 93, and 95 shown in FIGS. 8, 9, and 10 have a rectangular shape in a plan view. Instead, they may have an optional shape such as a semicircle, trapezoid, and ellipse.

Figure 11:
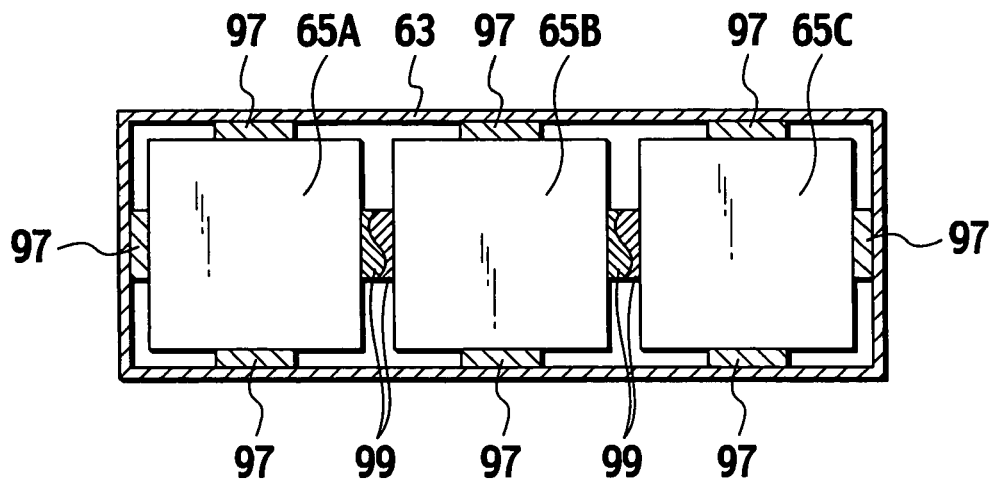
FIG. 11 is a view showing a modification of the second embodiment shown in FIG. 8 and corresponds to a sectional view taken along a line B-B of FIG. 4.

FIG. 11 is a view showing a modification of the second embodiment shown in FIG. 8 and corresponds to a sectional view taken along a line B-B of FIG. 4. Like the embodiment of FIG. 8, a separator 67 according to the modification has a rectangular shape. Each side of the separator 67 is provided with a rectangular elastic member 97 or 99. The elastic member 99 is arranged between the adjacent fuel cell stacks 65A and 65B, or between 65B and 65C. Confronting faces of the adjacent elastic members 99 are provided with concaves and convexes that engage with each other. This configuration promotes easy assembling of the fuel cell stacks 65A, 65B, and 65C into the casing 63 and prevents displacements between the adjacent fuel cell stacks.

Figure 12:
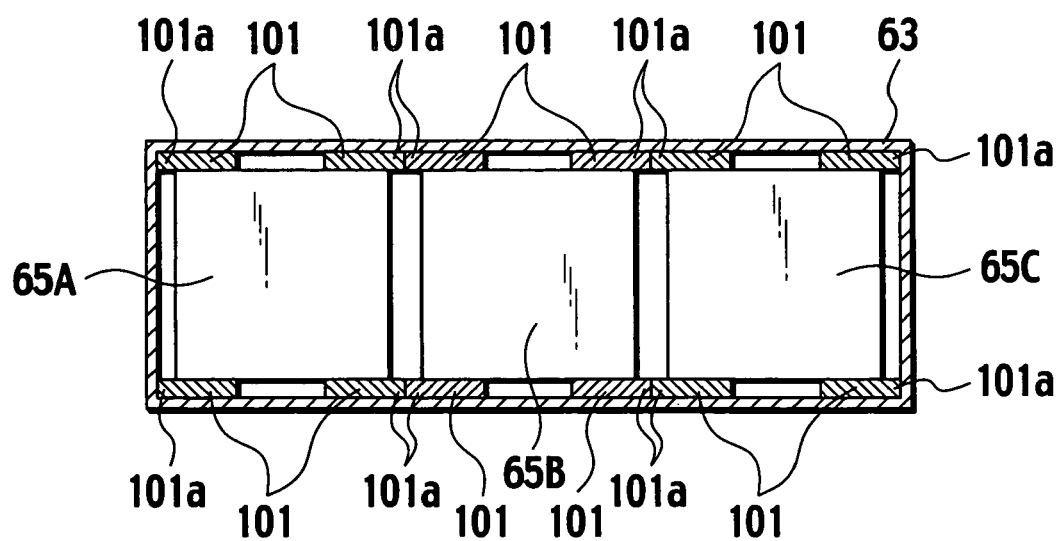
FIG. 12 is a view showing a modification of the third embodiment shown in FIG. 9 and corresponds to a sectional view taken along a line B-B of FIG. 4.

FIG. 12 is a view showing a modification of the third embodiment shown in FIG. 9 and corresponds to a sectional view taken along a line B-B of FIG. 4. Like the embodiment of FIG. 9, the modification arranges two elastic members 101 on each of the top and bottom sides of a separator 67. According to the modification, an outer end 101a of each elastic member 101 protrudes from the separator 67 so that the protruding end 101a may be in contact with the inner wall 63a of the casing 63 and/or the protruding end 101a of the elastic member 101 of the separator 67 of the adjacent fuel cell stack.

Any one of the elastic members 87, 89, 91, 93, 95, 97, 99, and 101 of the above-mentioned embodiments and modifications may be made of a different material from the seal 69. In this case, each elastic member is fixed to the periphery of the separator 67 with adhesive or is integrally formed with the separator 67 in a process that is different from a process of forming the seal 69. According to the above-mentioned embodiments and modifications, the tension rods 5 are passed through the fuel cell stack 3 (65A, 65B, 65C). Instead, each side face of the fuel cell stack 3 may be covered with a tension plate that extends in a fuel cell stacking direction. For such an arrangement, the elastic members 87 and 89 of the present invention are also applicable.

The separator 67 may be made of metal. The shape of the separator 67 is not limited to a rectangle. It may be circular, triangular, or polygonal such as pentagonal. The separator 67 may have an optional shape if the periphery of the shape is exposed to the outside. The shape of the casing 63 must conform to the shape of the separator 67.

According to the present invention, the elastic member is arranged at the periphery of the separator so that the elastic member may absorb vibration or shock externally applied to the casing. By doing so, the elastic member prevents the breakage of parts of the casing and fuel cells and secures the performance and reliability of the fuel cells.

At least one face of the separator is provided with the seal that is made of the same material as that of the elastic member. Employing the same material for the seal and elastic member enables the seal and elastic member to be simultaneously formed on the separator and eliminates a new process to be added for forming the elastic member. Namely, the elastic member is manufacturable through existing processes.

Forming a conventional seal for a separator needs a seal-material-pouring opening to be prepared in a plane of the separator in the vicinity of a location where the seal is formed. According to the present invention, the seal is simultaneously formed with the peripheral elastic member, and therefore, an opening for pouring material of the separator and elastic member can be formed at the periphery of the separator. Accordingly, the present invention can effectively use the area of the separator and expand an electricity generating active area.

At least one face of the separator is provided with the seal that is integral with the elastic member. Accordingly, there is no need of newly adding a process for forming the elastic member. Namely, the elastic member is manufacturable through existing processes.

The elastic member is entirely formed along the periphery of the separator, to efficiently absorb vibration and shock applied to the casing and fuel cells. This results in minimizing the twisting, bending, and deformation of the casing and fuel cells.

The separator may have a polygonal shape and each side of the polygonal separator may partly have the elastic member. The separator may have a rectangular shape with two opposite sides thereof each provided with the elastic member. This configuration can reduce material cost and weight compared with arranging the elastic member entirely along the periphery of the separator. The partial arrangement of the elastic member improves assembling workability because the partial arrangement of the elastic member reduces friction against the inner wall of the casing when fuel cell stacks are installed in the casing.

The entire contents of Japanese patent application P2004-219107 filed Jul. 27$^{th}$, 2004 are hereby incorporated by reference.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fuel cell apparatus comprising:
   at least one fuel cell stack including a plurality of unit fuel cells;

a casing having an inner wall, said casing being arranged and configured to accommodate the at least one fuel cell stack; and means for absorbing vibrations transmitted to the at least one fuel cell stack via the casing in such a way as to prevent torsion and bending deformation of the casing and the at least one fuel cell stack, wherein each of the plurality of unit fuel cells includes:
- a membrane electrode assembly including an electrolyte membrane and electrodes arranged on the electrolyte membrane; and
- a pair of separators sandwiching the membrane electrode assembly, wherein the vibrations absorbing means includes elastic members arranged on and protruding from the periphery of the pair of separators, the elastic members contacting with the inner wall of the casing, wherein
- each of the separators has a polygonal shape defined by a plurality of sides, and
- each of the elastic members has an inner part on a plane of the corresponding, one of the pair of separators and an outer part that covers a portion of a peripheral edge of the corresponding one separator.

2. The fuel cell apparatus of claim 1, wherein each of the elastic members has an undulated shape.

3. The fuel cell apparatus of claim 1, wherein each of the elastic members has angular irregularities.

4. The fuel cell apparatus of claim 1, wherein the separators include seals, each being on one face of the corresponding one of the pair of separators and configured to seal and surround a fuel gas passage and an oxidant gas passage, and the seals and the elastic members are integrally formed of the same material.

5. The fuel cell apparatus of claim 1, wherein:
the at least one fuel cell stack includes a plurality of fuel cell stacks;
the casing accommodates the plurality of fuel cell stacks; and
the elastic members of one of the plurality of fuel cell stacks are in contact with the elastic members of the adjacent one of the plurality of fuel cell stacks.

6. The fuel cell apparatus of claim 5, wherein:
the elastic members of the one of the plurality of fuel cell stacks and the elastic members of the adjacent one of the plurality of fuel cell stacks have each a curved contact face for firm engagement between the elastic members.

7. The fuel cell apparatus of claim 5, wherein:
the elastic members of the plurality of fuel cell stacks outwardly protrude from the separators for firm engagement with the inner wall of the casing.

8. The fuel cell apparatus of claim 1, wherein:
each of the elastic members is formed entirely along the periphery of the corresponding one or the separators.

9. The fuel cell apparatus of claim 1, wherein:
the outer part of each of the elastic members is linear.

10. The fuel cell apparatus of claim 1, wherein:
the outer part of each of the elastic members is curved.

11. The fuel cell apparatus of claim wherein:
each of the pair of separators has a rectangular shape defined by four sides; and
each of the elastic members is on opposite two of the four sides.

12. The fuel cell apparatus of claim 1, wherein:
the at least one fuel cell stack includes a plurality of fuel cell stacks;
the casing accommodates the plurality of fuel cell stacks; and
the elastic members of one of the plurality of fuel cell stacks are in contact with the elastic members of the adjacent one of the plurality of fuel cell stacks.

13. The fuel cell apparatus of claim 12, wherein:
the elastic members of the plurality of fuel cell stacks outwardly protrude from the separators for firm engagement with the inner wall of the casing.

14. The fuel cell apparatus of claim 12, wherein:
the elastic members of the one of the plurality of fuel cell stacks and the elastic members of the adjacent one of the plurality of fuel cell stacks have each a curved contact lace for firm engagement between the elastic members.

15. The fuel cell apparatus of claim 1, wherein:
opposite two of the plurality of sides of each of the separators are each provided with at least two of the elastic members.

* * * * *